(12) United States Patent
Jow et al.

(10) Patent No.: US 6,905,762 B1
(45) Date of Patent: Jun. 14, 2005

(54) NON-AQUEOUS ELECTROLYTE SOLUTIONS COMPRISING ADDITIVES AND NON-AQUEOUS ELECTROLYTE CELLS COMPRISING THE SAME

(75) Inventors: T. Richard Jow, Potomac, MD (US); Shengshui Zhang, Olney, MD (US); Kang Xu, Gaithersburg, MD (US); Michael S. Ding, Gaithersburg, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 6 days.

(21) Appl. No.: 10/060,186

(22) Filed: Feb. 1, 2002

Related U.S. Application Data

(60) Provisional application No. 60/269,478, filed on Feb. 20, 2001, provisional application No. 60/268,516, filed on Feb. 13, 2001, and provisional application No. 60/267,895, filed on Feb. 13, 2001.

(51) Int. Cl.$^7$ ................................................ H01M 6/16
(52) U.S. Cl. ........................ 428/332; 429/306; 429/321; 429/324; 429/331
(58) Field of Search ................................ 429/306, 321, 429/324, 331, 332

(56) References Cited

U.S. PATENT DOCUMENTS

| | | | | |
|---|---|---|---|---|
| 3,480,656 A | * | 11/1969 | Heiss et al. | 558/417 |
| 5,474,862 A | | 12/1995 | Okuno et al. | 429/197 |
| 5,580,684 A | | 12/1996 | Yokoyama et al. | 429/194 |
| 5,780,181 A | * | 7/1998 | Idota et al. | 429/332 |
| 5,830,600 A | | 11/1998 | Narang et al. | 429/192 |
| 5,916,708 A | | 6/1999 | Besenhard et al. | 429/199 |
| 6,010,806 A | | 1/2000 | Yokoyama et al. | 429/330 |
| 6,068,950 A | | 5/2000 | Gan et al. | 429/231.9 |
| 6,423,454 B1 | * | 7/2002 | Heider et al. | 429/345 |

FOREIGN PATENT DOCUMENTS

| | | | | |
|---|---|---|---|---|
| JP | 58-11534 | * | 1/1983 | C08L/23/02 |
| JP | 62-223382 | * | 10/1987 | D06N/3/12 |
| JP | 2-255821 | * | 10/1990 | C08G/18/38 |

OTHER PUBLICATIONS

"Development of High conductivity Lithium–ion Electrolytes for Low Temperature Cell Applications," M.C. Smart, V.V. Ratnakumar, S. Surampudi Proceedings of the 38$^{th}$ Power Sources Conference, Cherry Hill, NJ, Jun. 8–11, 1998.

(Continued)

*Primary Examiner*—Dah-Wei Yuan
(74) *Attorney, Agent, or Firm*—William V. Adams

(57) ABSTRACT

A non-aqueous electrolyte to be used in a Li-ion battery includes a lithium salt, a cyclic carbonate, a linear carbonate and an isocyanate-based additive, with the following general formula

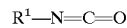

$$R^1\text{—}N\text{=}C\text{=}O$$

wherein $R^1$ represents linear or branched alkyl groups which have 1 to 7 carbon atoms, or aromatic groups having the following general formula

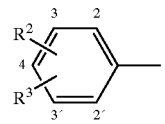

wherein $R^2$ and $R^3$, which may be the same or different and located at any positions of carbons 2, 2', 3, 3' and 4 in the benzyl ring, represent hydrogen atoms or halogen atoms, isocyanate groups, either groups, ester groups or alkyl groups, having 1 to 3 carbon atoms, and are optionally substituted with halogen atoms.

17 Claims, 12 Drawing Sheets

OTHER PUBLICATIONS

"Effect of Carbon Coating on Electrochemical Performance of Treated Natural Graphie as Lithium–Ion Battery Anode Material," Masaki Yoshio, Hongyu Wang, Kenji Fukuda, Yoichiro Hara and Yoshio Adachi Journal of The Electrochemical Society; 147 (4) 1245–1250 (2000).

"Low Temperature Electrolyte for Lithium and Lithium–Ion Batteries," Edward J. Plichta, Wishvender K. Behl.

"Relationships between Electrolyte and Graphite Electrode in Lithium Ion Batteries," Hizuru Koshina, Hajime Nishino, Kaoru Inoue, Akiyoshi Morita, Akira Ohta.

"Liquid–Solid Phase Diagrams of Binary Carbonates for Lithium Batteries," Journal of The Electrochemical Society, 147 (5) 1688–1694 (2000).

* cited by examiner

NON-AQUEOUS ELECTROLYTE SOLUTIONS COMPRISING ADDITIVES AND NON-AQUEOUS ELECTROLYTE CELLS COMPRISING THE SAME

CROSS-REFERENCE TO RELATED APPLICATION

This application claims the benefit of U.S. Provisional Application No. 60/268,516, filed Feb. 13, 2001; and both U.S. Provisional Application No. 60/269,478, filed Feb. 20, 2001, and U.S. Provisional Application No. 60/267,895, filed Feb. 13, 2001; each of which is incorporated by reference in its entirety.

GOVERNMENT INTEREST

The invention described herein may be manufactured, used and/or licensed by or for the United States Government.

BACKGROUND OF THE INVENTION

1. Field of the Invention

The present invention relates to high energy, non-aqueous electrolyte based electrochemical energy storage devices such as high energy density batteries or high power electrochemical capacitors. More particularly, this invention relates to high energy, non-aqueous electrolytes based electrochemical energy storage devices containing an electrolyte solution including isocyanate additives, which afford improved capacity retention at wide temperature ranges and increased reliability for PC-based electrolytes.

2. Discussion of the Prior Art

High voltage and high energy density rechargeable batteries based on non-aqueous electrolyte solutions are widely used as electric sources for various types of consumer electronic appliances, such as camcorders, notebook computers, and cell phones, because of their high voltage and high energy density as well as their reliability such as storage characteristics. This type of battery conventionally employs the complexed oxides of lithium and a transition metal as a positive electrode, such as $LiCoO_2$, $LiNiO_2$, $LiMn_2O_4$, and variations of the previous oxides with different dopants and different stoichiometry, and additionally includes lithium metal, lithium alloys and/or carbonaceous materials as a negative electrode. Chosen over the lithium metal and lithium alloys are carbonaceous negative electrode materials, which are in general partially or fully graphitized and specially modified natural graphite. When a carbonaceous negative electrode is used, this battery is often referred to as a lithium-ion (Li-ion) battery, because no pure lithium metal is present in the negative electrode. During charge and discharge processes, the lithium ions are intercalated into and de-intercalated from the carbonaceous negative electrode, respectively. The advantage of using these negative electrodes is that problems associated with growth of lithium metal dendrites is avoided. Such dendrites are often observed in lithium or lithium alloy negative electrodes, and are known to cause short-circuiting of the cells.

Non-aqueous electrolytes used in the-state-of-the-art lithium-ion batteries contain a solvent system that, in general, includes a cyclic carbonate compound, such as ethylene carbonate (EC) and propylene carbonate (PC), as well as a linear carbonate, such as dimethyl carbonate (DMC), diethyl carbonate (DEC), and ethylmethyl carbonate (EMC). The cyclic carbonates are chemically and physically stable and have high dielectric constant, which is necessary for their ability to dissolve salts. The linear carbonates are also chemically and physically stable and have low dielectric constant and low viscosity, which is necessary to increase the mobility of the lithium ions in the electrolytes. "PC-based electrolyte system" contains PC as one of the components and, when the only cyclic carbonate present is EC, the electrolyte system is considered "EC-based".

PC is oxidatively more stable than EC and has lower melting point, therefore, the electrolytes composed of PC have wider liquid temperature ranges. However, PC is not a preferred solvent in rechargeable batteries, especially in Li-ion batteries when the anode is made of a graphite-based carbonaceous material. This is because PC molecules co-intercalate together with Li ions into carbonaceous anode materials and decompose between graphite layers or the surface of carbonaceous anode, which subsequently exfoliates carbonaceous anode and yields some gases inside the batteries. These problems not only shorten the life and performance of the batteries, but also raise safety concerns with such batteries because of a build-up of the internal pressure. However, PC is a preferred solvent in rechargeable Li-ion batteries when the anode is made of amorphous hard carbon. This is because PC cannot co-intercalate into the structure of this type of carbon and therefore it becomes possible to take the advantages of PC in rechargeable Li-ion batteries.

The solutes conventionally used in typical electrolytes are lithium salts such as lithium hexaflurophosphate ($LiPF_6$), lithium imide ($LiN(SO_3CF_3)_2$), lithium trifluoromethane sulfonate ($LiCF_3SO_3$), lithium hexafluoroarsenate ($LiAsF_6$), and lithium tetrafluoroborate ($LiBF_4$).

In terms of cost and performance, graphite is a preferred anode material for rechargeable Li-ion batteries. Therefore, it is desirable to use graphite or graphitizable carbonaceous materials as anode materials with a highly oxidatively stable solvent such as PC. To avoid the problems of PC with graphite as mentioned above, it is desirable to develop an electrolyte system that can form a protective layer on the surface of graphite so that Li ions can pass through the layer but PC cannot.

Furthermore, it is desirable to improve Li-ion batteries with a graphite or graphitizable carbonaceous anode even for the electrolytes containing no PC solvent. This is because the protection layer formed on graphite surfaces in electrolytes composed of EC and linear carbonate solvents is resistive at temperatures below −20° C. (see, for example, Plichta et al., "Low Temperature Electrolyte for Lithium and Lithiun-Ion Batteries," *Proc. 38$^{th}$ Power Sources Conference*, p. 444, Cherry Hill, N.J., 8–11 Jun. 1998, herein incorporated by reference in its entirety). At temperatures above 50° C., the protection film loses its ability to protect the graphite electrode. As a result, the battery cannot retain its charge capacity through storage and cycling at elevated temperatures. Therefore, it is also desirable to improve the Li-ion battery with graphite anode and electrolytes containing no PC.

SUMMARY OF THE INVENTION

The present invention relates to electrolyte additives, which are added into non-aqueous electrolyte solution to improve the ability of protecting electrodes in electrolytes. In particular, this invention relates the formation of better protection between electrolyte and carbonaceous anode in rechargeable Li-ion batteries, and therefore resulting in batteries exhibiting long cycle life, high capacity utilization, and high capacity retention. The additives used in the present invention are a class of isocyanate-based compounds with the following general formula [1]

$$R^1—N=C=O \qquad [1]$$

wherein $R^1$ represents linear or branched alkyl groups which have 1 to 7 carbon atoms or aromatic groups having the following general formula [2]

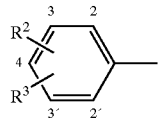
[2]

wherein $R^2$ and $R^3$, may be the same or different, and can be located at any positions indicated by carbons numbers 2, 2', 3, 3' and 4 in the benzyl ring, represent hydrogen atoms, halogen atoms (preferably fluorine atoms), isocynate groups, ether groups, ester groups or alkyl groups, which have 1 to 3 carbon atoms and may be substituted with one or more halogen atoms.

The amount of the additives in the electrolyte solutions is usually from 1 to 20 weight percent, preferably from 1 to 15 weight percent.

The electrolyte solutions comprise one or more Li salts, such as $LiPF_6$, and a mixture of cyclic carbonates such as propylene carbonate and ethylene carbonate, and linear carbonates such as dimethyl carbonate, diethyl carbonate, ethyl methyl carbonate, and the like.

The non-aqueous electrolyte cells of the present invention employ the electrolyte solutions comprising at least 1 to 15 weight percent of isocyanate-based additives of the general formula described above. The non-aqueous electrolyte cells employing the electrolyte solutions of the present invention will have the advantages such as high stability, good cycling efficiency, long cycle life, and wider liquid temperature range. Furthermore, the cells employing the electrolyte solutions of the present invention will have additional advantages of high capacity utilization and high capacity retention.

Additional objects, features and advantages of the present invention will become more fully apparent from the following detailed description of preferred embodiments, when taken in conjunction with the drawings wherein like reference numerals refer to corresponding parts in the several views.

DETAILED DESCRIPTION OF THE PREFERRED EMBODIMENTS

Figure 1:
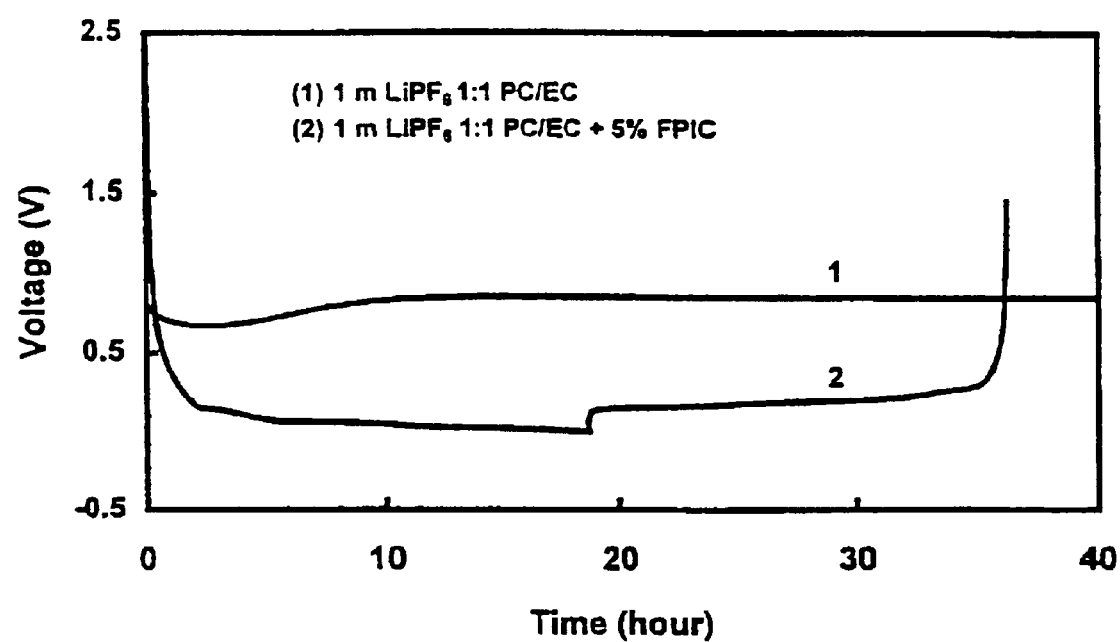
FIG. 1 shows the voltage curves of the graphite electrodes during the first cycle with respect to time in 1 m $LiPF_6$/PC-EC (1:1 wt ratio) electrolyte without and with 5 weight percent (wt %) of FPIC, respectively.

According to the present invention, the above objects and advantages of the present invention can be achieved by the use of non-aqueous electrolyte solutions containing isocyanates, as an additive, of the following general formula [1]

$$R^1—N=C=O \qquad [1]$$

wherein $R^1$ represents linear or branched alkyl groups which have 1 to 7 carbon atoms or aryl groups having the following general formula [2]

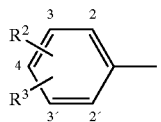
[2]

wherein $R^2$ and $R^3$, which may be the same or different and locate at any positions indicated by carbon numbers 2, 2', 3, 3' and 4 in the benzyl ring, represent hydrogen atoms, halogen atoms, preferably fluorine atoms, isocynate groups, ether groups, ester groups or alkyl groups, which have 1 to 7 carbon atoms and may contain one or more of halogen atoms.

Examples of a class of isocyanates according to the present invention include, but are not limited to, methyl isocyanate, ethyl isocyanate, propyl isocyanate, isopropyl isocyanate, butyl isocyanate, isobutyl isocyanate, sec-butyl isocyanate, tert-butyl isocyanate, difluoromethyl isocyanate, monofluoromethyl isocyanate, trifluoromethyl isocyanate, 2,2-difluoroethyl isocyanate, 2-fluoroethyl isocyanate, 2,2, 2-trifluoroethyl isocyanate, 3,3,2,2-tetrafluoropropyl isocyanate, 3,2,2-trifluoropropyl isocyanate, and 3,3,3,2,2-pentafluoropropyl isocyanate, 1,1,3,3-tetrafluoro-2-propyl isocyanate, 1,1,1,3,3,3-hexafluoro-2-propyl isocyanate, 2,2, 3,3,4,4,4-heptafluorobutyl isocyanate, perfluoro-t-butyl isocyanate. phenyl isocyanate, naphthyl isocyanate, 2-fluorophenyl isocyanate, 3-fluorophenyl isocyanate, 4-fluorophenyl isocyanate, 2,3-difluorophenyl isocyanate, 2,4-difluorophenyl isocyanate, 2,3'-difluorophenyl isocyanate, 2,2'-difluorophenyl isocyanate, 3,3'-difluorophenyl isocyanate, 3,4-difluorophenyl isocyanate,2, 3,4-trifluorophenyl isocyanate, 2,2',3-trifluorophenyl isocyanate, 2,2',4-trifluorophenyl isocyanate, 2,3,3'-trifluorophenyl isocyanate, 2-methylphenyl isocyanate, 4-methylphenyl isocyanate, 2-methoxyphenyl isocynate, 4-methoxyphenyl isocynate, 1,2-phenylene diisocynate, 1,3-phenylene diisocynate and 1,4-phenylene diisocynates.

The concentration of the isocynate additives in the electrolyte solutions may be from 1 to 20 weight percent. The preferred concentration range is from 1 to 15 weight percent. In general, the given amount of isocynate additives is directly added into a prepared electrolyte solution prior to use.

The electrolyte solutions comprise one or more Li salts and a mixture of conventionally used solvents. Typically, such solvents include cyclic carbonates and linear carbonates. Propylene carbonate, ethylene carbonate, butylene carbonate and/or vinylene carbonate are typical examples of cyclic carbonates, while the linear carbonates are conventionally dimethyl carbonate, diethyl carbonate, ethyl methyl carbonate, methyl propyl carbonate, methyl isopropyl carbonate, methyl butyl carbonate and/or ethyl butyl carbonate.

In the mixture of solvents used in the electrolyte solutions, preferably the content of the cyclic carbonates can range from 10 to 90% by weight, and that of the linear carbonates can range from 10 to 90% by weight, but other weight ratios are possible.

The solutes contained in the electrolyte solutions of the present invention may be one or more of these lithium salts, such as $LiPF_6$, $LiBF_4$, $LiAsF_6$, $LiClO_4$, $LiCF_3SO_3$, $LiN(CF_3SO_2)_2$, and $LiAlCl_4$, while $LiPF_6$ is preferred. The concentration of the solute in the electrolyte solutions may be from 0.1 to 3 mol/liter, preferably, 0.5 to 2 mol/liter.

The non-aqueous electrolyte solution of the present invention may be utilized in a non-aqueous electrolyte cell. Such cells include the solution according to the present invention, along with at least a negative electrode, a positive electrode, and a separator. Such cells are described in U.S. Provisional Application No. 601268,516 (ARL 01-15, Feb. 13, 2001, herein incorporated by reference in its entirety.

Lithium metal, lithium alloys and carbonaceous materials capable of being intercalated and de-intercalated with lithium ions can be used as the negative electrode. However, the carbonaceous materials capable of being intercalated and de-intercalated with lithium ions are preferred. Such carbonaceous materials may be graphite, amorphous carbon, or any other carbon material, such as activated carbon, carbon fibers, carbon black, and mesocarbon microbeads.

As the positive electrode materials, transition metal oxides such as $MnO_2$ and $V_2O_5$, transition metal sulfides such as $MoS_2$ and $TiS_2$, conducting polymers such as polyaniline and polypyrrole, compounds capable of being reversibly polymerized and de-polymerized by electrolysis such as disulfide compounds, complexed oxides of lithium and transition metals such as $LiCoO_2$, $LiMnO_2$, $LiMn_2O_4$, and $LiNiO_2$ and the like can be used, and the complexed oxides of lithium and transition metals are preferred.

The non-aqueous electrolyte cells of the present invention comprise the non-aqueous electrolyte solutions explained above as electrolyte solutions. By using the electrolyte solutions of the present invention, these cells can achieve high discharge capacity, maintain high discharge/charge efficiency, and retain high discharge capacity after many repeated charge/discharge cycles, as will be elucidated with reference to the Examples below.

The shape of the non-aqueous electrolyte cells of the present invention is not particularly limited and they may have a shape selected within the scope of the present invention such as cyclinderical shape, rectangular shape, coin-like shape, card-like shape, large size shape and the like.

Additionally, it is considered with the scope of the present invention to utilize the electrolyte and electrolyte cells in non-aqueous electrolyte secondary or rechargeable cells of practical use.

The present invention will be illustrated by referring to the following examples hereinafter, but the present invention is by no way limited by these examples.

EXAMPLE 1

Effect of 4-Fluorophenyl Isocyanate (FPIC) on Stability of 1 m $LiPF_6$/PC-EC (1:1 wt Ratio) Electrolyte Versus Graphite Two Li/graphite cells with an electrode area of 6 cm² were assembled. One cell was filled with 1 m $LiPF_6$/PC-EC (1:1 wt ratio) electrolyte, and the other one was filled with the same electrolyte but containing 5 wt % of FPIC. Both cells were carried out a discharge-charge cycling test between 0.002 V and 1.0 V at a constant current density of 0.093 mA/cm². FIG. 1 shows voltages of these two cells versus the experimental time. The cell using 1 m $LiPF_6$/PC-EC (1:1 wt ratio) electrolyte (shown as line 1) could not discharge to below 0.8 V due to decomposition of PC solvents. In comparison, the cell using the same electrolyte with 5 wt % of FPIC (line 2) completed a reversible discharge-charge cycle with a columbic efficiency of 94%. Thus indicating that FPIC protects PC from decomposition on a graphite electrode.

EXAMPLE 2

Figure 2:
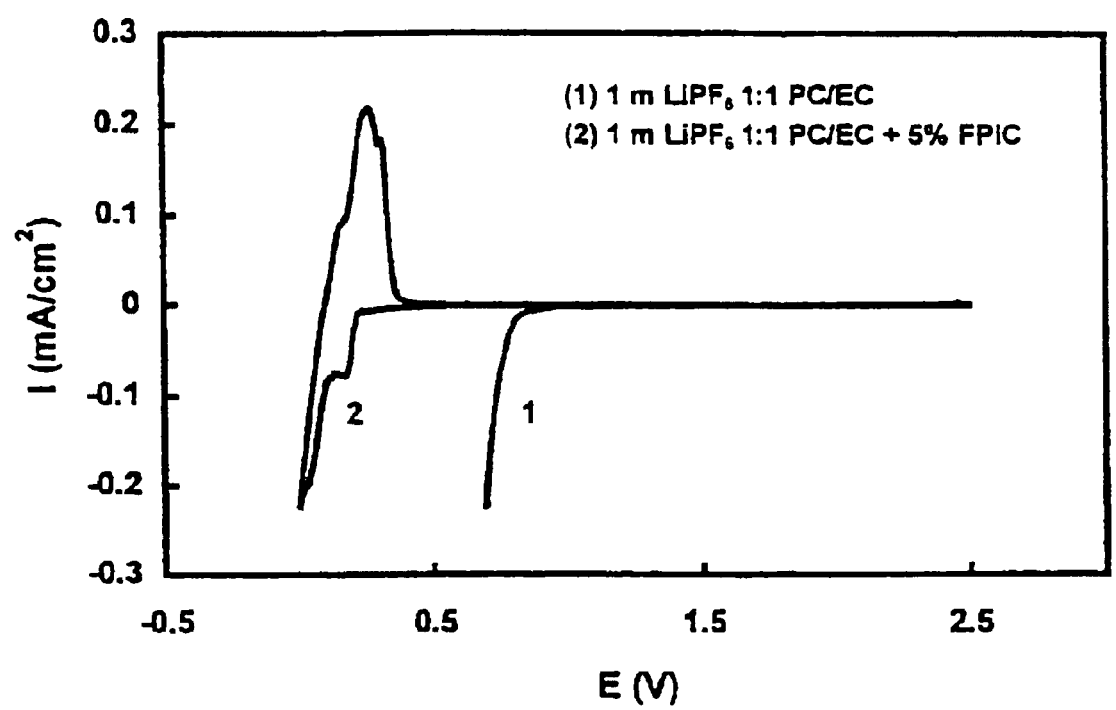
FIG. 2 shows cyclic voltammograms of the graphite electrodes during the first cycle in 1 m $LiPF_6$/PC-EC (1:1 wt ratio) electrolyte without and with 5 wt % of FPIC, respectively.

Cyclic Voltammograms of 1 m $LiPF_6$/PC-EC (1:1 wt Ratio) Electrolytes Without and with 4-fluorophenyl Isocyanate Two identical Li/graphite cells as described in example 1 were assembled. The stability of the electrolytes was tested using a cyclic voltammetry technique at a scanning rate of 0.01 mV/s between 2.5 V and 0 V. Cyclic voltammograms of these two cells are shown in FIG. 2. An increase in cathodic current was observed when the voltage was scanned from 2.5 to about 0.95 V versus $Li^+$/Li in 1 m $LiPF_6$/PC-EC electrolyte. The experiment was terminated at around 0.7 V because the cathodic current was increased continuously without the appearance of a peak. The cell using 1 m $LiPF_6$/PC-EC electrolyte with 5 wt % of FPIC (line 2) displayed a pair of reduction-oxidization current peaks with a coulomb efficiency of 97%. The current reduction peak and the oxidation current peak indicate, respectively, the intercalation of Li ions into graphite and the de-intercalation of Li ions out of graphite.

EXAMPLE 3

Figure 3:
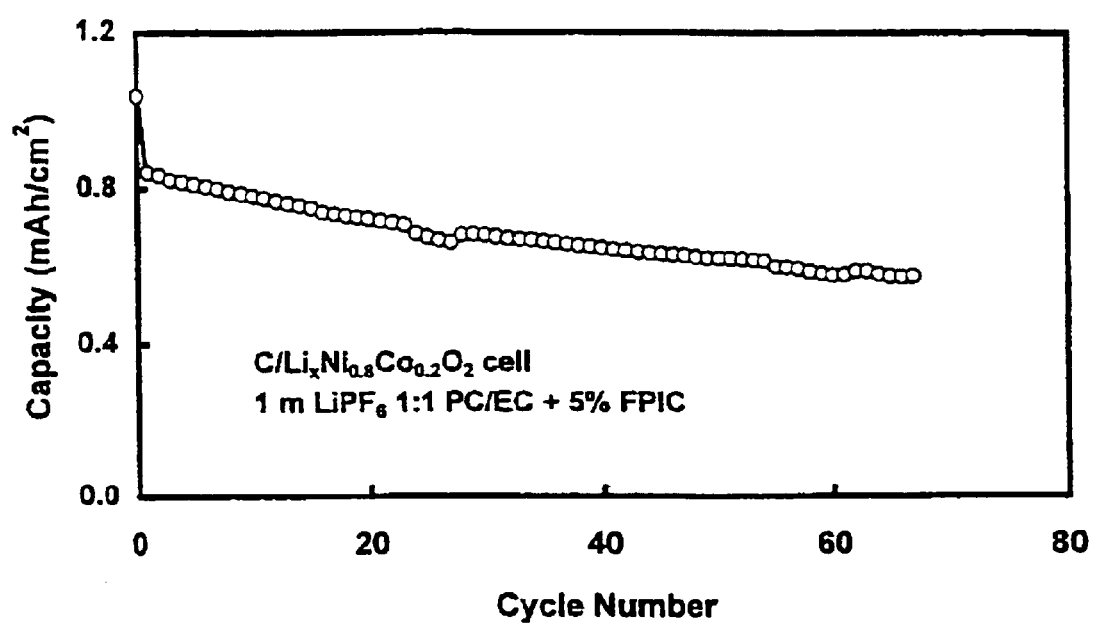
FIG. 3 shows discharge capacity of graphite/$Li_xNi_{0.8}Co_{0.2}O_2$ cell in an electrolyte of 1.0 m $LiPF_6$/PC-EC (1:1) with 5% FPIC.

Cycling Performance of Graphite/$Li_xNi_{0.8}Co_{0.2}O_2$ Cells Using 1 m $LiPF_6$/PC-EC (1:1 wt Ratio) Electrolyte Without or with 5% of FPIC Two graphite/$Li_xNi_{0.8}Co_{0.2}O_2$ button cells with an electrode area of 1.27 cm² were assembled. 1 m $LiPF_6$/PC-EC (1:1 wt ratio) electrolyte was added to both cells, and 5 wt % of FPIC was also added to one of the two cells. Both cells were then tested under a constant current charge and discharge cycle between 3.9 and 2.5 V. The current density used was 0.3 mA/cm$^2$ (after the first cycle, in which the current density was 0.093 mA/cm$^2$). The cell including only 1 m LiPF$_6$/PC-EC (1:1 wt ratio) electrolyte could not be charged to 3.0 V. This means that because the carbonaceous anode could not be charged in this electrolyte as shown in FIG. 1 of Example 1. The cell using 1 m LiPF$_6$/PC-EC (1:1 wt ratio) electrolyte with 5 wt % of FPIC was able to be cycled with good capacity retention as shown in FIG. 3. This example indicates that graphite/Li$_x$Ni$_{0.8}$Co$_{0.2}$O$_2$ cell is able to charge and discharge repeatedly in 1 m LiPF$_6$/PC-EC (1:1 wt ratio) electrolyte in the presence of FPIC, without a significant reduction in charge capacity.

EXAMPLE 4

Figure 4:
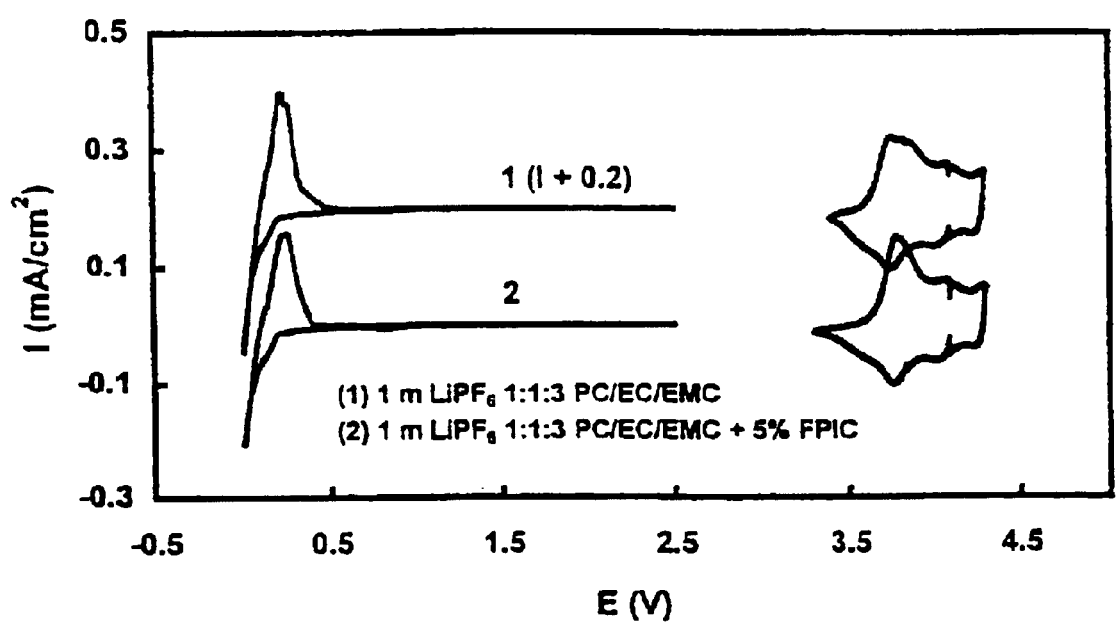
FIG. 4 shows cyclic voltammograms of the graphite and $Li_xNi_{0.8}Co_{0.2}O_2$ electrodes in 1 m $LiPF_6$/PC-EC-EMC (1:1:3 wt ratio) electrolytes without and with FPIC, respectively.

Cyclic Voltammograms of Li/graphite and Li/Li$_x$Ni$_{0.8}$Co$_{0.2}$O$_2$ Cells Using 1 m LiPF$_6$/PC-EC-EMC (1:1:3 wt Ratio) Electrolytes Without and with FPIC Two Li/graphite cells and two Li/Li$_x$Ni$_{0.8}$Co$_{0.2}$O$_2$ cells were assembled as described in Example 1, and were each filled with 1 m LiPF$_6$/PC-EC-EMC (1:1:3 wt ratio) electrolyte. To one cell of each electrolyte pair, 5 wt % FPIC was added. The stability of the electrolytes against the electrodes was tested using a cyclic voltammetry technique at a scanning rate of 0.01 mV/s between 2.5 V and 0.02 V for Li/graphite cells and between 3.3 V and 4.3 V for Li/Li$_x$Ni$_{0.8}$Co$_{0.2}$O$_2$ cells. Cyclic voltammograms of these cells are shown in FIG. 4, from which coulomb efficiency of the Li/graphite cell during the first cycle was determined to be 86% in 1 m LiPF$_6$/PC-EC-EMC electrolyte (line 1) and 85% when 5% FPIC is added (line 2). This Example is included to indicate that both graphite and Li$_x$Ni$_{0.8}$Co$_{0.2}$O$_2$ electrodes work well in 1 m LiPF$_6$/PC-EC-EMC electrolytes with and without FPIC, as little difference in coulomb efficiency results.

EXAMPLE 5

Figure 5:
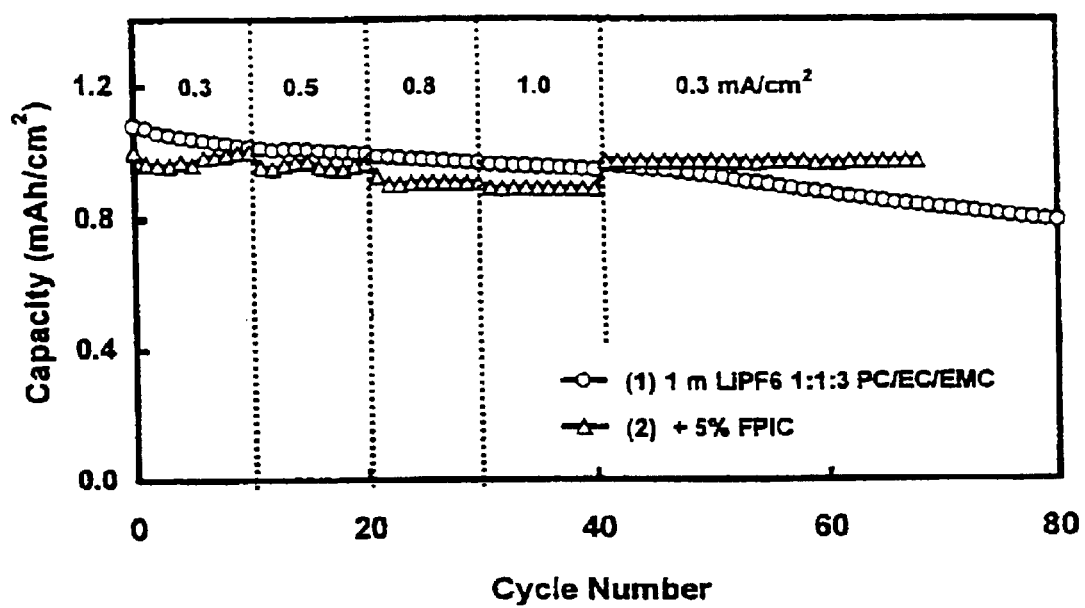
FIG. 5 shows cycling performance of the graphite/$Li_xNi_{0.8}Co_{0.2}O_2$ cells using 1 m $LiPF_6$/PC-EC-EMC (1:1:3 wt ratio) electrolyte without or with 5 wt % of FPIC, respectively, being at a substantially constant rate.

Cycling Performance of Graphite /Li$_x$Ni$_{0.8}$Co$_{0.2}$O$_2$ Cells Using 1 m LiPF$_6$/PC-EC-EMC (1:1:3 wt Ratio) Electrolyte Without or with 5 wt % of FPIC Two graphite/Li$_x$Ni$_{0.8}$Co$_{0.2}$O$_2$ cells with an electrode area of 1.27 cm$^2$ were assembled. One cell was filled with 1 m LiPF$_6$/PC-EC-EMC (1:1:3 wt ratio) electrolyte and the other cell was filled with the same electrolyte and 5 wt % FPIC. Both cells were carried out a charge-discharge cycle between 2.5 V and 3.9 V. The current density for the first cycle was 0.093 mA/cm$^2$, and the current density for the subsequent cycles was 0.3, 0.5, 0.8, and 1.0 mA/cm$^2$ as shown in FIG. 5. Cycling performance of the graphite/Li$_x$Ni$_{0.8}$Co$_{0.2}$O$_2$ cells is shown in FIG. 5, which indicates that the cell employing 5 wt % of FPIC in electrolyte started with a slightly lower discharge capacity, but held better capacity retention. Especially, line 1 shows a marked reduction in capacity with increased cycles (and differing current densities), while the cell including FPIC (line 2) does not show such a reduction. In fact, a slight increase in capacity is shown when cycled at 0.3 mA/cm$^2$.

EXAMPLE 6

Figure 6:
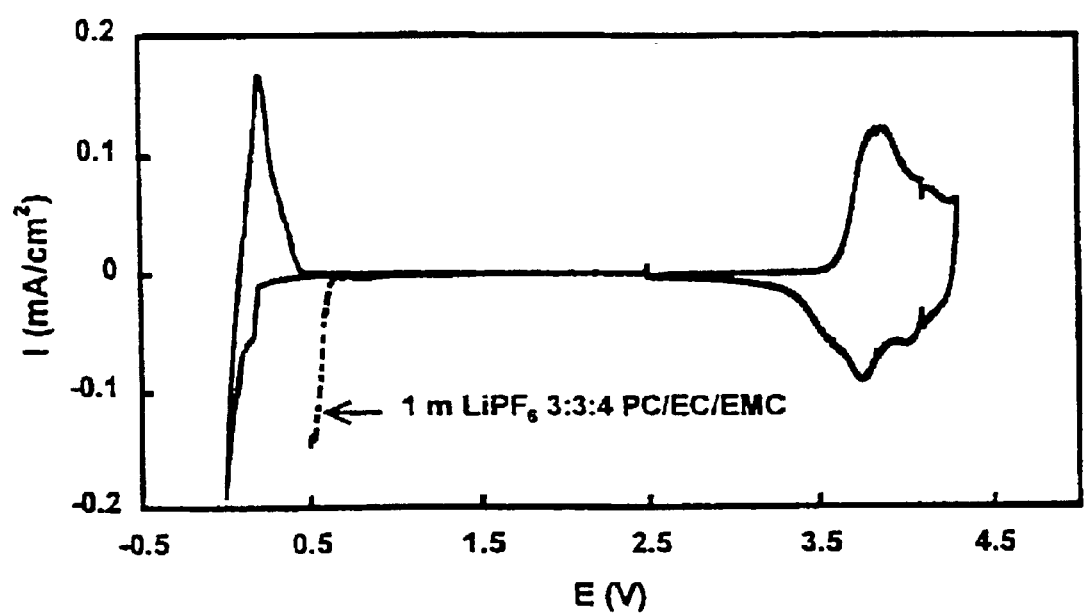
FIG. 6 shows the effect of FPIC on the stability of 1 m $LiPF_6$/PC-EC-EMC (3:3:4 wt ratio) electrolyte with or without 5% wt FPIC in the presence of graphite and $Li_xNi_{0.8}Co_{0.2}O_2$ electrodes.

Effect of FPIC on Stability of 1 m LiPF$_6$/PC-EC-EMC (3:3:4 wt Ratio) Electrolyte with Respect to Graphite and Li$_x$Ni$_{0.8}$Co$_{0.2}$O$_2$ Electrodes An Li/graphite cell and a Li/Li$_x$Ni$_{0.8}$Co$_{0.2}$O$_2$ cell, each with an electrode area of 6 cm$^2$, were assembled and filled with 1 m LiPF$_6$/PC-EC-EMC (3:3:4 wt ratio) electrolyte containing 5 wt % of FPIC. The stability of the electrolyte was tested using a cyclic voltammetry technique at a scanning rate of 0.01 mV/s between 2.5 V and 0 V for Li/graphite and between 2.5 V and 4.3 V for Li/Li$_x$Ni$_{0.8}$CO$_{0.2}$O$_2$ cell. The cyclic voltammograms of these two cells for the second cycle are shown in FIG. 6. It was calculated from FIG. 6 that the coulomb efficiency of the Li/graphite cell was as 97% and that of the Li/Li$_x$Ni$_{0.8}$Co$_{0.2}$O$_2$ cell was 96%. For comparison, the cyclic voltammogram of a Li/graphite cell employing the same electrolyte without the addition of FPIC (shown as the dotted line) is also plotted in FIG. 6, showing a decomposition of PC at 0.65 V.

EXAMPLE 7

Figure 7:
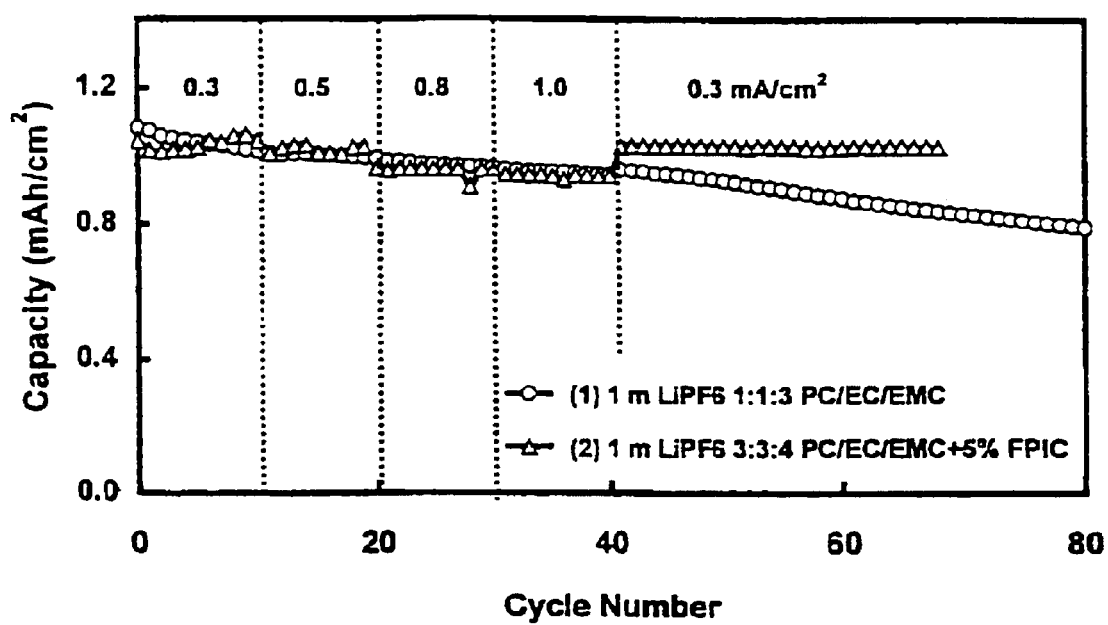
FIG. 7 shows the cycling performance of graphite/$Li_xNi_{0.8}Co_{0.2}O_2$ cell using 1 m $LiPF_6$/PC-EC-EMC (3:3:4 wt ratio) electrolyte with 5 wt % of FPIC, compared to an electrolyte of 1.0 m $LiPF_6$/PC-EC (1:1:3 wt ratio).

Cycling Performance of a Graphite/Li$_x$Ni$_{0.8}$Co$_{0.2}$O$_2$ Cell Using 1 m LiPF$_6$/PC-EC-EMC (3:3:4 wt Ratio) Electrolyte With 5 wt % of FPIC Two graphite/Li$_x$Ni$_{0.8}$Co$_{0.2}$O$_2$ button cells, each with an electrode area of 1.27 cm$^2$ were assembled and filled with 1 m LiPF$_6$/PC-EC-EMC (3:3:4 wt ratio) electrolyte. One of the two cells was also filled with 5 wt % of FPIC. A charge-discharge test between 2.5 V and 3.9 V at a constant current density was carried out for these two cells. The current density for the first cycle was 0.093 mA/cm$^2$, and the current densities of the subsequent cycles were 0.3, 0.5, 0.8, and 1.0 mA/cm$^2$ as shown in FIG. 7. The voltage of the cell employing 1 m LiPF$_6$/PC-EC-EMC (3:3:4 wt ratio) electrolyte without FPIC (line 1) could not reach up to 3.0 V, whereas the cell employing 1 m LiPF$_6$/PC-EC-EMC (3:3:4 wt ratio) electrolyte with 5 wt % of FPIC (line 2) cycled well.

EXAMPLE 8

Cycling Performance of Graphite/Li$_x$Ni$_{0.8}$Co$_{0.2}$O$_2$ Cells Using 1 m LiPF$_6$/PC-EC-EMC (1:1:3 wt Ratio) Electrolyte Without or with 5 wt % of Phenyl Isocyanate (PIC)

Figure 8:
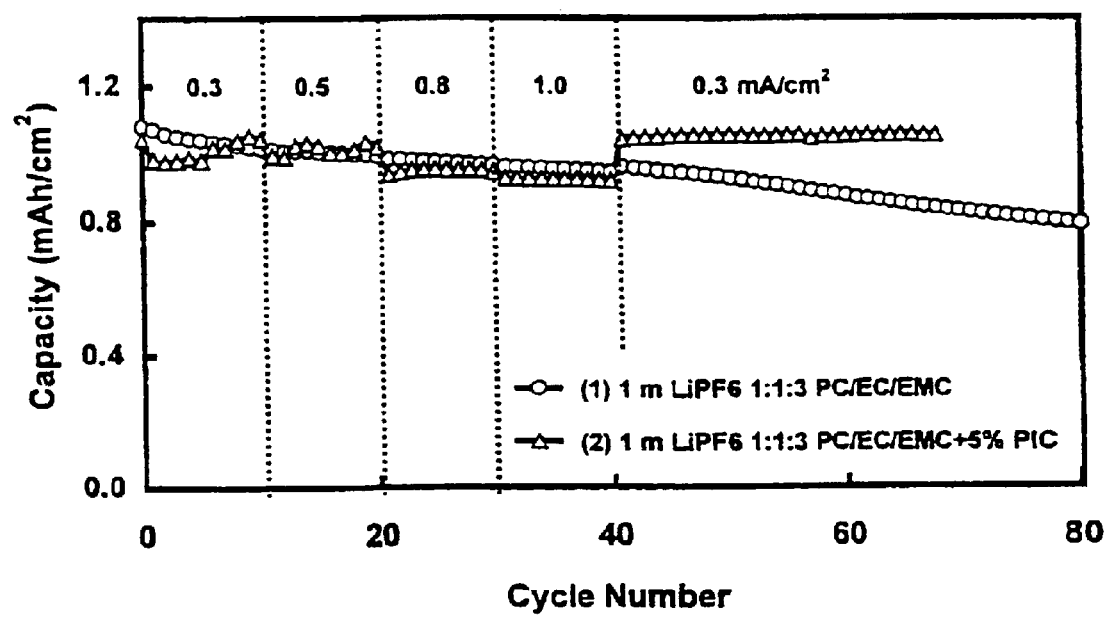
FIG. 8 shows the cycling performance of graphite/$Li_xNi_{0.8}Co_{0.2}O_2$ cells using 1 m $LiPF_6$/PC-EC-EMC (1:1:3 wt ratio) electrolyte without or with 5 wt % of PIC, respectively.

Two graphite /Li$_x$Ni$_{0.8}$Co$_{0.2}$O$_2$ cells with an electrode area of 1.27 cm$^2$ were assembled. One cell was filled with 1 m LiPF$_6$/PC-EC-EMC (1:1:3 wt ratio) electrolyte and the other cell was filled with the same electrolyte additionally containing 5 wt % of PIC. A charge-discharge test was carried out for both cells between 2.5 V and 3.9 V under constant current. The current density for the first cycle was 0.093 mA/cm$^2$, and the current density for the subsequent cycles was 0.3, 0.5, 0.8, and 1.0 mA/cm$^2$ as shown in FIG. 8. The discharge capacities as function of cycle number of the graphite/Li$_x$Ni$_{0.8}$Co$_{0.2}$O$_2$ cells are shown in FIG. 8. The results indicate that the cell employing 5 wt % PIC (line 2) in the electrolyte maintained a relatively high capacity retention, while the cell without 5 wt % PIC exhibited a decreased capacity as the number of cycles.

EXAMPLE 9

Figure 9:
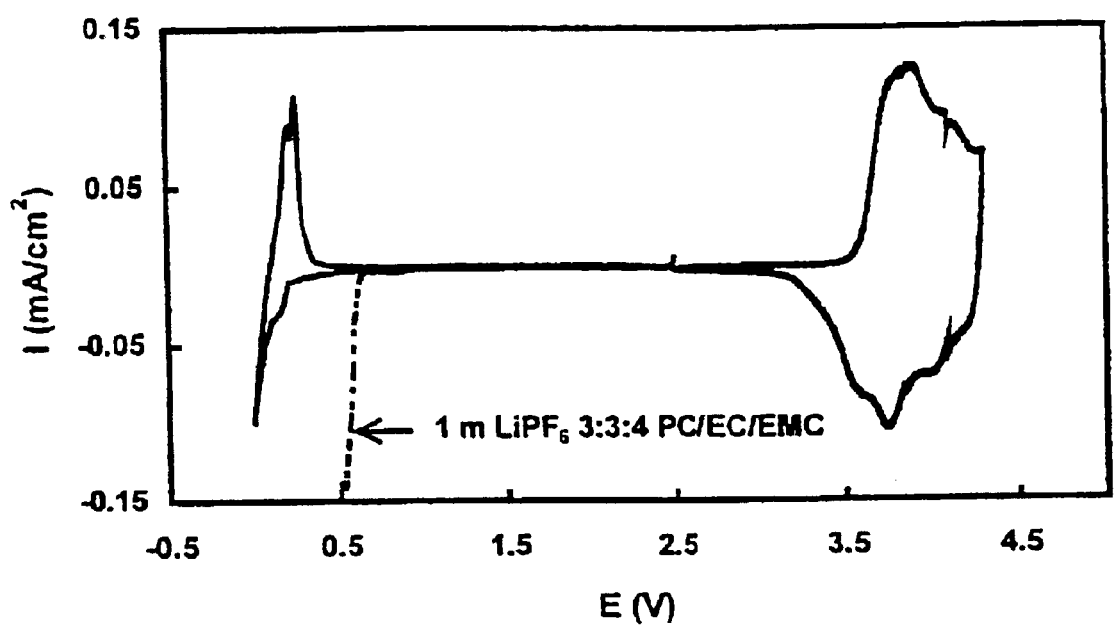
FIG. 9 shows the stability of 1 m $LiPF_6$/PC-EC (3:3:4 wt ratio) electrolyte containing 5 wt % of PIC with respect to graphite and $Li_xNi_{0.8}Co_{0.2}O_2$ electrodes, respectively, as compared to an electrolyte of 1.0 m $LiPF_6$/PC-EC (3:3:4 wt ratio)

Stability of 1 m LiPF$_6$/PC-EC (3:3:4 wt Ratio) Electrolyte with PIC Against Graphite and Li$_x$Ni$_{0.8}$Co$_{0.2}$O$_2$ Electrodes A Li/graphite cell and a Li/Li$_x$Ni$_{0.8}$Co$_{0.2}$O$_2$ cell, each with an electrode area of 6 cm$^2$, were assembled and filled with 1 m LiPF$_6$/PC-EC (3:3:4 wt ratio) electrolyte containing 5 wt % of PIC. The stability of the electrolyte was tested using a cyclic voltammetry technique at a scan rate of 0.01 mV/s between 2.5 and 0 V for the Li/graphite cell and between 2.5 and 4.3 V for the Li/Li$_x$Ni$_{0.8}$Co$_{0.2}$O$_2$ cell. A cyclic voltammograms of these two cells for the first cycle is shown in FIG. 9. Calculated from FIG. 9, the coulomb efficiency for the graphite-containing electrode was 79% and that for the Li$_x$Ni$_{0.8}$Co$_{0.2}$O$_2$-containing electrode was 97%. For comparison, the cyclic voltammogram of a Li/graphite cell employing the same electrolyte without PIC is also plotted in FIG. 9 (shown as a dotted line). An increase in the cathodic current at about 0.65 V indicates that a dramatic decomposition of PC at this potential in electrolyte without PIC.

EXAMPLE 10

Figure 10:
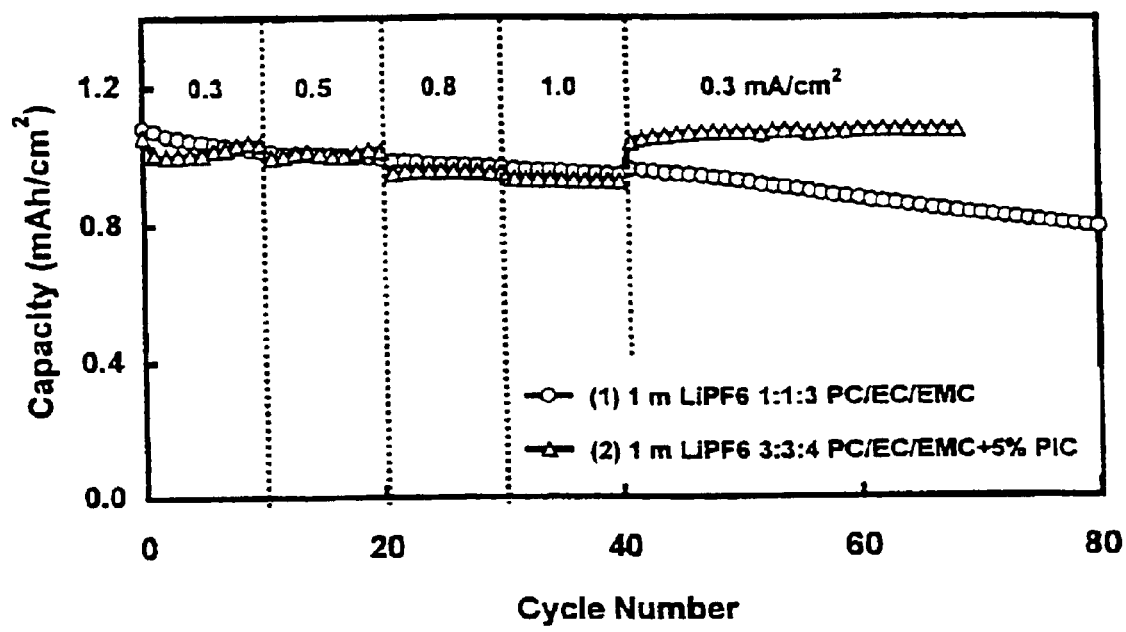
FIG. 10 shows the cycling performance of the graphite/$Li_xNi_{0.8}Co_{0.2}O_2$ cell using 1 m $LiPF_6$/PC-EC-EMC (3:3:4 wt ratio) electrolyte with 5 wt % of PIC.

Cycling Performance of Graphite/Li$_x$Ni$_{0.8}$Co$_{0.2}$O$_2$ Cell Using 1 m LiPF$_6$/PC-EC-EMC (3:3:4 wt Ratio) Electrolyte with 5 wt % PIC Two graphite/Li$_x$Ni$_{0.8}$Co$_{0.2}$O$_2$ button cells, each with an electrode area of 1.27 cm$^2$, were assembled and filled with 1 m LiPF$_6$/PC-EC-EMC (3:3:4 wt ratio) electrolyte. One of the two cells was also filled with 5% wt of PIC. A charge-discharge test was carried out for these two cells between 2.5 V and 3.9 V at a constant current density. The current density for the first cycle was 0.093 mA/cm$^2$, and the current density for the subsequent cycles was 0.3, 0.5, 0.8, and 1.0 mA/cm$^2$ as shown in FIG. 10. The voltage of the cell employing 1 m LiPF$_6$/PC-EC-EMC (3:3:4 wt ratio) electrolyte without PIC (line 1) could not reach up to 3.0 V, and the experiment was terminated. Whereas the cell employing 1 m LiPF$_6$/PC-EC-EMC (3:3:4 wt ratio) electrolyte with 5 wt % PIC (line 2) was cycled well as shown in FIG. 10. FIG. 10 shows that the number of cycles increased, the capacity of the cell without PIC tended to decrease, while the PIC-containing cell exhibited no such decrease.

EXAMPLE 11

Figure 11:
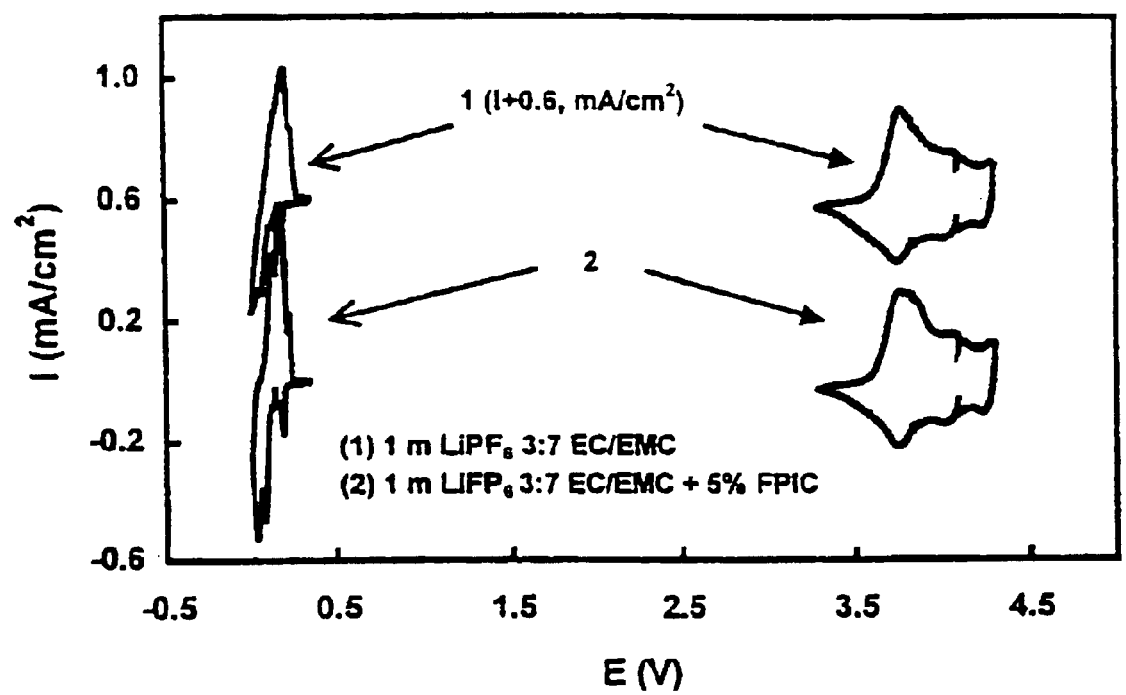
FIG. 11 shows the cyclic voltammograms of the graphite anode and Li/$Li_xNi_{0.8}Co_{0.2}O_2$ cathode in 1 m $LiPF_6$/EC-EMC (3:7 wt ratio) electrolyte without or with FPIC, respectively.

Cyclic Voltammograms of Li/graphite and Li/Li$_x$Ni$_{0.8}$Co$_{0.2}$O$_2$ Cells Using 1 m LiPF$_6$/EC-EMC (3:7 wt Ratio) Electrolytes with and Without FPIC Two Li/graphite cells and two Li/Li$_x$Ni$_{0.8}$Co$_{0.2}$O$_2$ cells were assembled in the manner described in Example 1. Each was filled with 1 m LiPF$_6$/EC-EMC (3:7 wt ratio) electrolyte, and to one 5 wt % wt FPIC was added. The stability of the electrolytes was tested against the electrodes using a cyclic voltammetry technique at a scanning rate of 0.01 mV/s between 2.5 V and 0 V for the Li/graphite cells and between 3.3 V and 4.3 V for the Li/Li$_x$Ni$_{0.8}$Co$_{0.2}$O$_2$ cells. The resulting cyclic voltammograms of these cells for the second cycle are shown in FIG. 11. FIG. 11 demonstrates that both the graphite anode and the Li$_x$Ni$_{0.8}$Co$_{0.2}$O$_2$ cathode are reversible in 1 m LiPF$_6$/EC-EMC electrolytes with and without FPIC, as the resulting capacities are similar.

EXAMPLE 12

Figure 12:
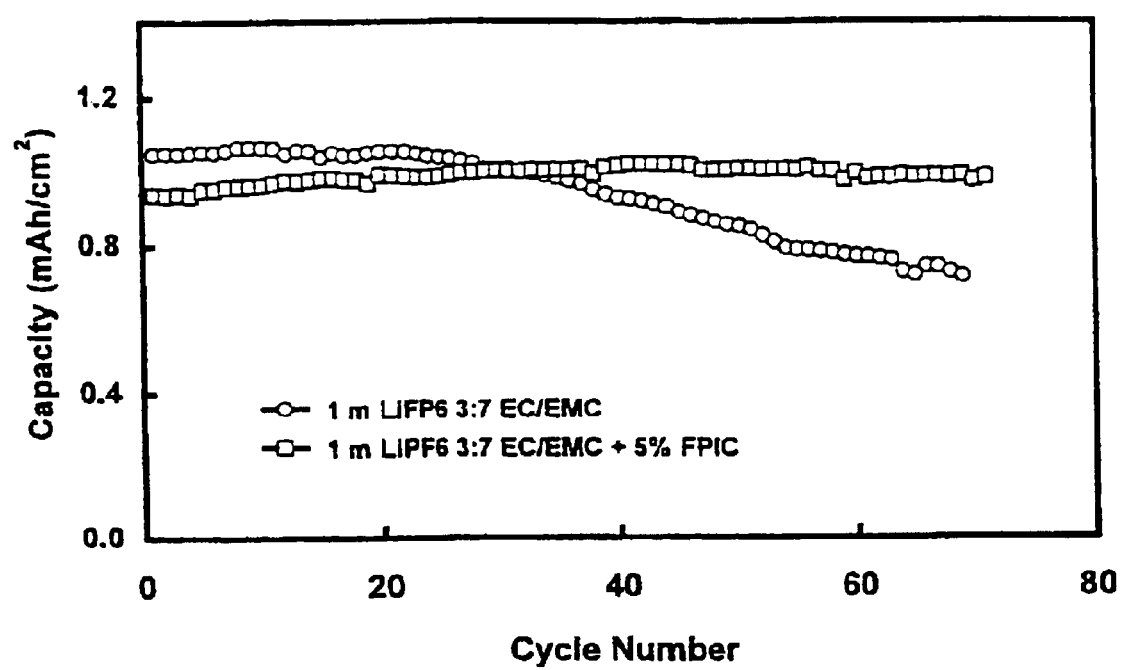
FIG. 12 shows the effect of FPIC on cycling performance of the graphite/$Li_xNi_{0.8}Co_{0.2}O_2$ cell using 1 m $LiPF_6$/EC-EMC (3:7 wt ratio) electrolyte.

Effect of FPIC on Cycling Performance of Graphite/Li$_x$Ni$_{0.8}$Co$_{0.2}$O$_2$ Cell Using 1 m LiPF$_6$/EC-EMC (3:7 wt Ratio) Electrolyte Two graphite/Li$_x$Ni$_{0.8}$Co$_{0.2}$O$_2$ button cells, each with an electrode area of 1.27 cm$^2$, were assembled and filled with 1 m LiPF$_6$/EC-EMC (3:7 wt ratio) electrolyte. One of the cells was also filled with 5 wt % of FPIC. A charge-discharge test was carried out for both cells between 2.5 V and 3.9 V at a constant current density of 0.3 mA/cm$^2$. The discharge capacity as a function of the cycle number for the graphite/Li$_x$Ni$_{0.8}$Co$_{0.2}$O$_2$ cells is shown in FIG. 12. The results indicate that the cell employing 5 wt % FPIC in electrolyte (line with squares) started with a slightly lower discharge capacity but retained capacity better than the cell employing the electrolyte without FPIC (line with circles) after extended cycles.

Although the present invention is described herein with reference to preferred embodiments and examples, it should readily understood that various changes and/or modifications could be made to the invention without departing from the spirit thereof. In any event, the invention is only intended to be limited by the scope of the following claims.

We claim:

1. A non-aqueous electrolyte solution comprising:
    at least one lithium salt; and
    a solvent comprising,
        at lest one cyclic carbonate;
        at least one linear carbonate; and
        as an additive, one or more isocyanate components of the following general formula [1]

$$R^1-N=C=O \qquad [1]$$

wherein R$^1$ represents aromatic groups having the following general formula [2]

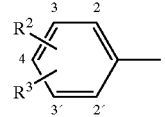

wherein R$^2$ and R$^3$ are fluorine and are located at any positions of carbons 2,2',3,3' and 4 in the benzyl ring.

2. The non-aqueous electrolyte solution of claim 1, wherein said one or more isocyanate component is 1–50% wt of said solvent.

3. The non-aqueous electrolyte solution of claim 2, wherein said one or more isocyanate component is 1–15% wt of said solvent.

4. The non-aqueous electrolyte solution of claim 1, wherein said lithium salt is selected from the group consisting of LiPF$_6$, LiBF$_4$, LiAsF$_6$, LiClO$_4$, LiCF$_3$SO$_3$, LiN(CF$_3$SO$_2$)$_2$, and LiAlCl$_4$.

5. The non-aqueous electrolyte solution of claim 4, wherein said lithium salt is LiPF$_6$.

6. The non-aqueous electrolyte solution of claim 1, wherein said lithium salt has a concentration of from 0.1–3 mol/L.

7. The non-aqueous electrolyte solution of claim 6, wherein said lithium salt has a concentration from 0.5–2 mol/L.

8. The non-aqueous electrolyte solution of claim 1, wherein said at least one cyclic carbonate is selected from the group consisting of propylene carbonate, ethylene carbonate, bulylene carbonate and vinylene carbonate.

9. The non-aqueous electrolyte solution of claim 1, wherein said cyclic carbonate is 10–90% wt of said solvent.

10. The non-aqueous electrolyte solution of claim 1, wherein said linear carbonate is selected from the group consisting of dimethyl carbonate, diethyl carbonate, ethyl methyl carbonate, methyl propyl carbonate, methyl isopropyl carbonate, methyl butyl carbonate and ethyl butyl carbonate.

11. The non-aqueous electrolyte solution of claim 1, wherein said linear carbonate is 1.0–60% wt of said solvent.

12. A non-aqueous electrolyte cell comprising:
the non-aqueous electrolyte solution of claim 1;
a positive electrode and a negative electrode, in said non-aqueous electrolyte solution; and
a separator between said positive electrode and said negative electrode.

13. The non-aqueous electrolyte cell of claim 12, wherein said negative electrode is selected from the group consisting of lithium metal, lithium alloys and carbonaceous materials capable of being intercalated and de-intercalated with lithium ions.

14. The non-aqueous electrolyte cell of claim 13, wherein said positive electrode is selected from the group consisting of transition metal oxides, transition metal sulfides, conducting polymers and compounds capable of being reversibly polymerized and de-polymerized by electrolysis.

15. The non-aqueous cell of claim 13, wherein said cell is a secondary cell.

16. A non-aqueous electrolyte cell comprising:
a non-aqueous electrolyte solution comprising:
at least one lithium salt; and
a solvent comprising,
at least one cyclic carbonate;
at least one linear carbonate; and
as an additive, one or more isocyanate components of the following general formula [1]

R$^1$—N=C=O  [1]

wherein R$^1$ represents aromatic groups having the following general formula [2]

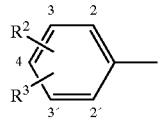

[2]

wherein R$^2$ and R$^3$ are fluorine and are located at any positions of carbons 2,2',3,3' and 4 in the benzyl ring;
a positive electrode and a negative electrode, in said non-aqueous electrolyte solution; and
a separator between said positive electrode and said negative electrode.

17. A non-aqueous electrolyte cell comprising:
a non-aqueous electrolyte solution comprising:
at least one lithium salt, selected from the group consisting of LiPF$_6$, LiBF$_4$, LiAsF$_6$, LiClO$_4$, LiCF$_3$SO$_3$, LiN(CF$_3$SO$_2$)$_2$, and LiAlCl$_4$; and
a solvent comprising,
at least one cyclic carbonate;
at least one linear carbonate;
as an additive, one or more isocyanate components of the following general formula [1]

R$^1$—N=C=O  [1]

wherein R$^1$ represents aromatic groups having the following general formula [2]

[2]

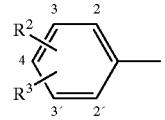

wherein R$^2$ and R$^3$ are fluorine and are located at any positions of carbons 2,2',3,3' and 4 in the benzyl ring; being 1–15% wt of said solvent;
a positive electrode, selected from the group consisting of transition metal oxides, transition metal sulfides, conducting polymers and compounds capable of being reversibly polymerized and de-polymerized by electrolysis and a negative electrode;
a negative electrode, selected from the group consisting of lithium metal, lithium alloys and carbonaceous materials capable of being intercalated and de-intercalated with lithium ions; and
a separator between said positive electrode and said negative electrode.

* * * * *